United States Patent
Yamin et al.

(10) Patent No.: US 10,360,445 B2
(45) Date of Patent: *Jul. 23, 2019

(54) SYSTEM AND METHOD FOR TRACKING PERSONS USING A VOLUMETRIC REPRESENTATION

(71) Applicant: Akcelita, LLC, San Juan, PR (US)

(72) Inventors: Rene Yamin, San Juan, PR (US);
Rafael Esparra, San Juan, PR (US);
Giovany Vega, San Juan, PR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/100,396

(22) Filed: Aug. 10, 2018

(65) Prior Publication Data

US 2018/0365486 A1    Dec. 20, 2018

Related U.S. Application Data

(63) Continuation-in-part of application No. 15/441,736, filed on Feb. 24, 2017, now Pat. No. 10,049,462.

(60) Provisional application No. 62/312,251, filed on Mar. 23, 2016.

(51) Int. Cl.
*G06K 9/00* (2006.01)

(52) U.S. Cl.
CPC ..... *G06K 9/00369* (2013.01); *G06K 9/00214* (2013.01); *G06K 9/00771* (2013.01); *G06K 9/00778* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,188,777 B1 * | 2/2001 | Darrell | ............... | G06K 9/00362 348/169 |
| 7,483,049 B2 * | 1/2009 | Aman | ................ | A63B 24/0021 348/162 |
| 7,565,858 B2 * | 7/2009 | Boyd | ..................... | F41H 11/02 250/203.6 |
| 7,623,674 B2 * | 11/2009 | Nichani | ............. | G06K 9/00778 340/545.1 |
| 7,688,349 B2 * | 3/2010 | Flickner | ............. | G06K 9/00362 348/150 |
| 8,494,227 B2 * | 7/2013 | Prokoski | ............... | A61B 5/0064 382/115 |
| 8,630,460 B2 * | 1/2014 | Brown | .................. | G06T 19/006 348/169 |

(Continued)

*Primary Examiner* — Anand P Bhatnagar
(74) *Attorney, Agent, or Firm* — Eugenio J. Torres-Oyola; Victor M. Rodriguez-Reyes; Rafael Rodriguez-Muriel

(57) ABSTRACT

A system and method for tracking and annotating objects in a 3D model is disclosed. The method includes receiving a signal feed from a group of sensors including at least one depth sensor, determining a reference signal feed from the signal feed, determining a volumetric representation of at least one object not present in the reference signal feed, assigning a unique volumetric profile to at least one object, and/or storing the unique volumetric profile in an object database. The signal feed may include at least one 3D area of interest. Also, the unique volumetric profile may include a unique volumetric id obtained from a group of attributes. The unique volumetric profile may include at least a unique volumetric position and a unique volumetric centroid. The group of sensors may further include video cameras, thermal, and chemical sensors.

17 Claims, 8 Drawing Sheets

(56) References Cited

U.S. PATENT DOCUMENTS

| | | | | |
|---|---|---|---|---|
| 8,761,445 | B2* | 6/2014 | Shamir | G06K 9/6293 |
| | | | | 348/143 |
| 9,025,906 | B2* | 5/2015 | Breckenridge | G06T 11/60 |
| | | | | 382/284 |
| 9,904,852 | B2* | 2/2018 | Divakaran | G06K 9/00771 |
| 2003/0107649 | A1* | 6/2003 | Flickner | G06K 9/00362 |
| | | | | 348/150 |
| 2005/0163345 | A1* | 7/2005 | van den Bergen | |
| | | | | G08B 13/19682 |
| | | | | 382/103 |
| 2007/0279494 | A1* | 12/2007 | Aman | G01S 3/7864 |
| | | | | 348/169 |
| 2011/0150271 | A1* | 6/2011 | Lee | G06K 9/00335 |
| | | | | 382/103 |
| 2014/0169696 | A1* | 6/2014 | Breckenridge | G06T 11/60 |
| | | | | 382/284 |
| 2014/0169697 | A1* | 6/2014 | Breckenridge | G06T 11/60 |
| | | | | 382/284 |
| 2015/0297949 | A1* | 10/2015 | Aman | G06T 7/246 |
| | | | | 348/157 |
| 2016/0381339 | A1* | 12/2016 | Inaba | G11B 27/031 |
| | | | | 386/223 |
| 2018/0053305 | A1* | 2/2018 | Gu | G06T 7/90 |

\* cited by examiner

| |
|---|
| RECEIVING SIGNAL FEED FROM PLURALITY OF SENSORS — 702 |
| DETERMINING REFERENCE SIGNAL FEED FROM SIGNAL FEED — 704 |
| DETERMINE VOLUMETRIC REPRESENTATION OF AT LEAST ONE PERSON NOT PRESENT IN REFERENCE SIGNAL FEED — 706 |
| ASSIGN UNIQUE VOLUMETRIC PROFILE TO AT LEAST ONE PERSON — 708 |
| STORE UNIQUE VOLUMETRIC PROFILE IN PERSON DATABASE — 710 |
| UNIQUE VOLUMETRIC ID OBTAINED FROM PLURALITY OF VOLUMETRIC ATTRIBUTES — 712 |
| DONE — 714 |

FIG. 7

SYSTEM AND METHOD FOR TRACKING PERSONS USING A VOLUMETRIC REPRESENTATION

PRIORITY

This application claims priority from U.S. patent application Ser. No. 15/441,736, filed on Feb. 24, 2017.

BACKGROUND

Current object tracking mechanisms are costly, inaccurate, and/or computationally expensive and fail to provide means for annotation of information related to the moving object.

For example, U.S. Pat. No. 7,688,349 is directed towards a system that can track individuals to determine whether the individuals belong to the same group. However, the '349 patent discloses the use of video cameras and does not provide a unique identification (id) for each individual in the group.

Similarly, U.S. Pat. No. 8,630,460 is directed towards a system and method useful for augmenting a 2D image into a 3D representation. This system, like most similar systems, utilizes video cameras to capture the environment and does not provide means for annotating the detected objects with metadata as provided herein.

Along the same lines, U.S. Pat. No. 7,327,362 provides a method for providing volumetric representations of three-dimensional objects. However, this method requires assigning foreground and background voxels to a silhouette, a feature that is not required in this disclosure.

Using a depth sensor, determining the contour and volumetric representation of an object, and annotating said volumetric representation with additional data including, but not limited to, data obtained from additional sensors, such as microphones or video cameras, and/or new data developed from the data provided from those sensors, overcomes the challenges over the prior art and affords an inexpensive solution to track and annotate moving objects. The present disclosure overcomes one or more of the problems found in the prior art.

BRIEF SUMMARY

In this disclosure, a volumetric sensor is a sensor from which a volumetric representation of an object may be reasonably calculated in real-time. Examples of a volumetric sensor include time-of-flight sensors from which depth can be calculated (i.e. depth sensors) and/or thermal sensors. Video cameras are generally not useful to accurately calculate a volumetric representation of an object but video cameras may be used in conjunction with a volumetric sensor to determine related physical attributes that can be annotated as metadata such as color. Other sensors, such as microphones, thermal, and chemical may also be used to annotate the unique volumetric profile with metadata. For example, the metadata can include chemical information detected using chemical sensors with application in marketing or security surveillance.

In some embodiments, the method may include receiving a signal feed from a group of sensors including at least one depth sensor, determining a reference signal feed from the signal feed, determining a volumetric representation of at least one object not present in the reference signal feed, assigning a unique volumetric profile to at least one object, and/or storing the unique volumetric profile in an object database. The signal feed may include at least one 3D area of interest. Also, the unique volumetric profile may include a unique volumetric id obtained from a group of volumetric attributes. In some embodiments, the unique volumetric profile may include at least a unique volumetric position and a unique volumetric centroid. The group of sensors may further include at least one video sensor.

In some embodiments, the method includes receiving a signal feed from a volumetric sensor; calculating a reference signal feed from the signal feed; defining a queue entry point, a queue exit point and a queue path in the reference signal feed; detecting the presence of an object in the signal feed; assigning a unique volumetric profile to the object; annotating the unique volumetric profile with metadata obtained from the volumetric sensor, as well as other sensors; storing the unique volumetric profile in an object database; and/or retrieving the unique volumetric profile from the object database. The annotated unique volumetric profile may additionally include metadata such as a unique volumetric id and a unique volumetric position in the queue path. In some embodiments, the unique volumetric position in the queue path is determined with respect to the queue entry point and the queue exit point.

In some embodiments, the method includes receiving a signal feed from a volumetric sensor; calculating a reference signal feed from the signal feed; determining an optimal signal space for detecting persons; detecting the presence of a person in the signal feed; assigning a unique volumetric profile to the person; the unique volumetric profile; storing the unique volumetric profile in a person database; and/or retrieving the unique volumetric profile from the person database. The unique volumetric profile may additionally include a unique volumetric id and a unique volumetric position.

In some embodiments, the method may include receiving a signal feed from a group of sensors including at least one depth sensor, determining a reference signal feed from the signal feed, determining a volumetric representation of at least one person not present in the reference signal feed, assigning a unique volumetric profile to the at least one person, and/or storing the unique volumetric profile in a person database. The signal feed may include at least one area of interest. Also, the unique volumetric profile may include a unique volumetric id obtained from a group of volumetric attributes. In some embodiments, the unique volumetric profile may include at least a unique volumetric position and a unique volumetric centroid. The group of sensors may further include at least one video sensor.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 7 illustrates a routine in accordance with one embodiment.

DETAILED DESCRIPTION

Figure 1:
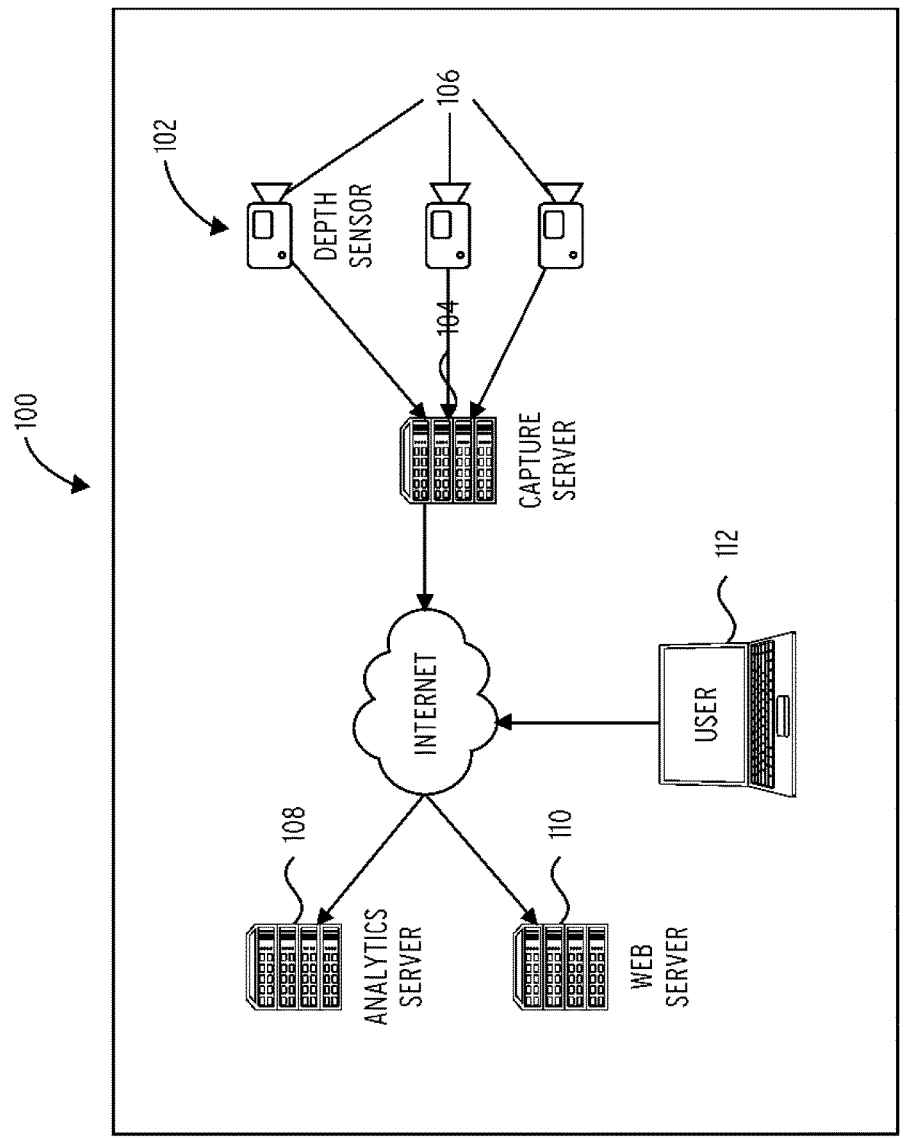
FIG. 1 illustrates an exemplary infrastructure for the object tracking system.

According to FIG. 1, tracking system 100 includes a capture server 104 operationally connected to a plurality of sensors 106 in a physical site. The plurality of sensors 106 includes at least one depth sensor 102. The plurality of sensors 106 may include any suitable type of sensor such as a video camera, a microphone, or other sensors. The data captured by the capture server 104 is filtered and processed to obtain a volumetric representation of a moving object captured by the plurality of sensors 106. These volumetric representations are further processed to obtain a unique volumetric id and a unique volumetric profile for each moving object. The unique volumetric profile may include metadata such as the unique volumetric centroid and the unique volumetric position of the moving object.

After processing the captured data, the capture server 104 generates and sends data packet to the analytics server 108. As discussed, said data packet contains metadata information about the moving objects captured by the plurality of sensors 106. Communication between the capture server 104 and the analytics server 108 may be initiated in any suitable fashion such as a remote procedure call or an API. In some embodiments, the communication is performed in JSON, YAML, XML, or any similar format. In some embodiments, communication is performed by way of database or storage replication.

The analytics server 108 further processes the data from the capture server 104. For instance, the analytics server 108 may aggregate data from a plurality of capture servers. According to some embodiments, the analytics server 108 applies techniques to determine aggregated information from a plurality of physical sites. After analytics server 108 processes the data, it places the result in a format suitable for display in a web server 110. The web server 110 provides access to a user 112 to the processed data in analytics server 108.

The capture server 104, analytics server 108 and web server 110 each include at least one processor, RAM memory, storage medium, and a connection to the Internet.

Figure 2:
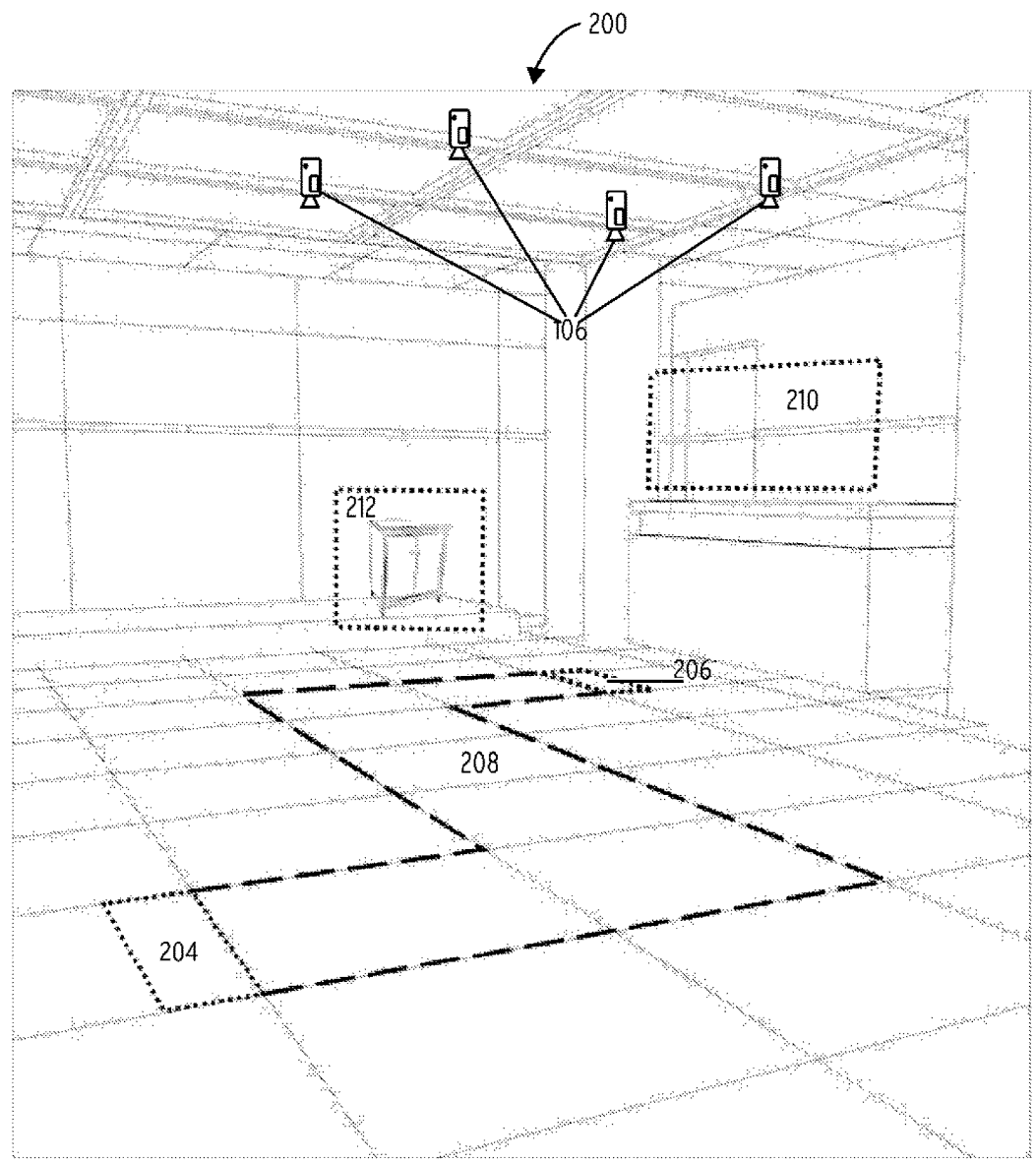
FIG. 2 illustrates a site managed by the tracking system.

FIG. 2 shows an exemplary site tracked by a plurality of sensors 106, including at least one depth sensor 102. In one embodiment, the reference signal feed includes a queue entry point 204, a queue exit point 206, and a queue path 208.

Queue entry point 204 marks the place where the users enter the queue. In most sites, this marker is placed visibly with signs. Similarly, queue path 208 is the path that customers follow to get to queue exit point 206. In most sites, the queue path 208 will also be marked visibly with crowd control products such as retractable belt barriers. Once a customer representative is available, the customer gets out of the queue through queue exit point 206 and approaches customer service area 210. The plurality of sensors 106 may also track the interaction of customers with watched object 212, for example, for marketing or security measures.

The tracking system 100 allows site managers to measure, for example, the number of customers in the queue, the time they spent waiting in queue, and/or the productivity of employees at customer service area 210.

As shown in the picture, the plurality of sensors 106 may be mounted on the ceiling. However, it will be apparent to a person skilled in the art that the sensors may be wall-mounted, attached to furniture, or installed in other ways known by persons skilled in the art.

Figure 3:
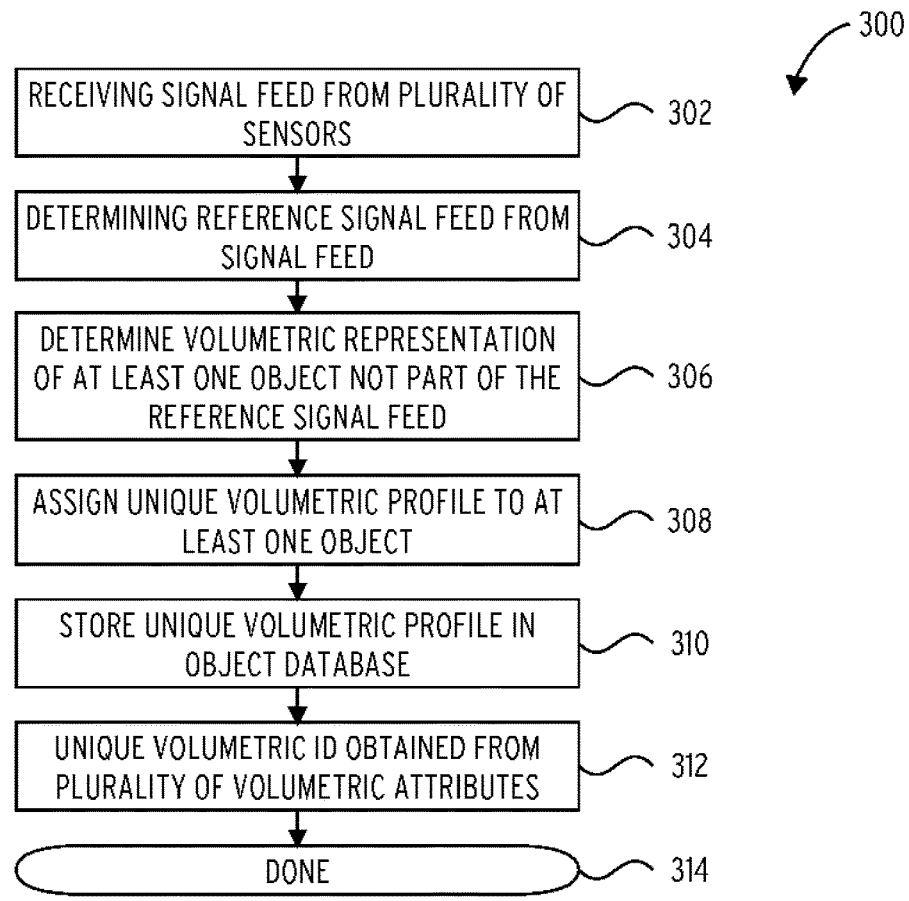
FIG. 3 illustrates a routine for obtaining a unique volumetric profile of an object in a reference signal feed in accordance with one embodiment.

Referring to FIG. 3, in block 302, routine 300 receiving a signal feed from a plurality of sensors. The plurality of sensors include at least one depth sensor 102. Other types of sensors, such as thermal sensors and video cameras, may be suitable for obtaining and annotating volumetric representations of objects.

In block 304, routine 300 determines a reference signal feed from the signal feed. The reference signal feed is obtained by detecting non-movable objects in the signal feed. Other filters may also be applied, such as ignoring all objects outside (above or below) of a height threshold. This may be useful, for example, to ignore objects such as plants, crowd control devices, lamps, and other undesired objects.

In block 306, routine 300 determines a volumetric representation of at least one object not part of the reference signal feed. When the object is detected, the contour of said object is obtained. According to one embodiment, the contour is then placed inside of a rectangle in order to use less computing resources when following said object.

In block 308, routine 300 assigns a unique volumetric profile to the at least one object. The unique volumetric profile contains all metadata obtained from the object. In one embodiment, the unique volumetric profile contains metadata from a plurality of sensors, such as video cameras, thermal sensors, microphones, and others. In some embodiments, the unique volumetric profile includes at least a unique volumetric id and a unique volumetric centroid.

In block 310, routine 300 stores the unique volumetric profile in an object database. The object database may be any kind of suitable storage such as a structured database, a column-based database or a text file in a format such as JSON or YAML. This may be needed, for example, to compare the unique volumetric profile with a new object detected in the reference signal feed.

In block 312, routine 300 obtains a unique volumetric id from a plurality of volumetric attributes. Assigning a unique volumetric id may be performed by finding unique features of an object based on the object's metadata and additional indirect calculations, such as its total volume, height, position, weight, color and others. In one embodiment, these unique features are simply based on the location of the object. In other embodiments, statistical and machine learning techniques may be used to train the system and later identify a volumetric representation once it reappears on screen after leaving the reference signal feed. In "DONE" block 314, routine 300 ends.

Figure 4:
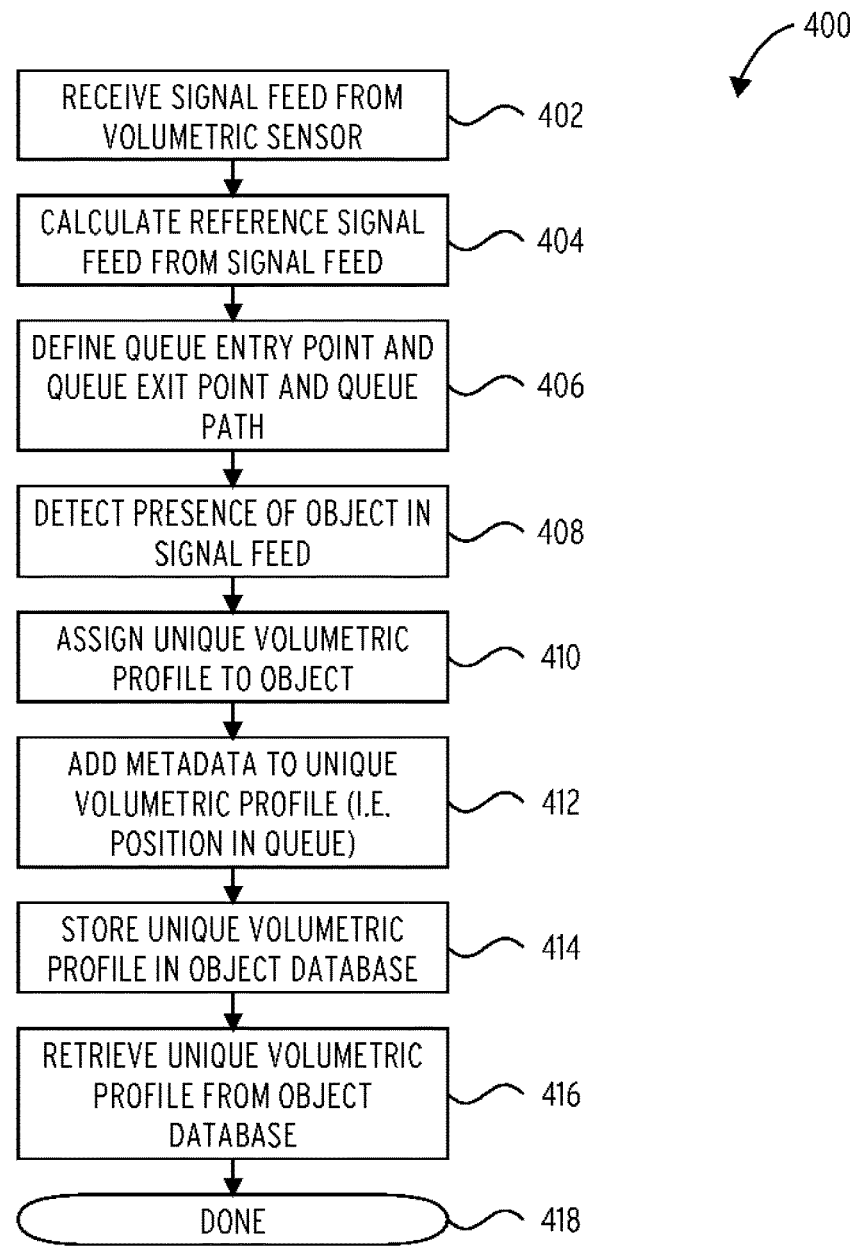
FIG. 4 illustrates a routine for managing a queue in a reference signal feed in accordance with one embodiment.

FIG. 4 shows an example embodiment of a queue tracking system. Such an embodiment is useful, for example, to determine how many customers are in a queue and how much time are they waiting to be served.

In block 402, routine 400 receives a signal feed from a volumetric sensor.

In block 404, routine 400 calculates a reference signal feed from the signal feed. As in FIG. 3, the reference signal feed is obtained by detecting non-movable objects in the signal feed. Other filters may also be applied, such as ignoring all objects outside (above or below) of a height threshold.

In block 406, routine 400 defines a queue entry point and a queue exit point and a queue path. The queue entry point is the section where customers enter the queue and the queue exit point is the section where customers exit the queue. The queue path may be optionally established to detect whether an object has left the queue even though it may still be visible in the reference signal feed.

In block 408, routine 400 detects the presence of an object in the signal feed. When an object is detected, the routine 400 detects the object's contour and calculates the volumetric representation from said contour and assigns an entry time timestamp. In block 410, routine 400 assigns a unique volumetric profile to the object. In block 412, routine 400 adds metadata from the object to the unique volumetric profile. The unique volumetric profile contains metadata about the object such as pixel colors obtained from video cameras, sounds obtained from microphones, position in the queue, time and height variation at each position (gait), and others.

In block 414, routine 400 stores the unique volumetric profile in an object database. In block 416, routine 400 retrieves the unique volumetric profile from the object database. Storage and retrieval of the unique volumetric profile may be used, for example, to compare the unique volumetric profile with a new object detected in the reference signal feed. In "DONE" block 418, routine 400 ends.

Figure 5:
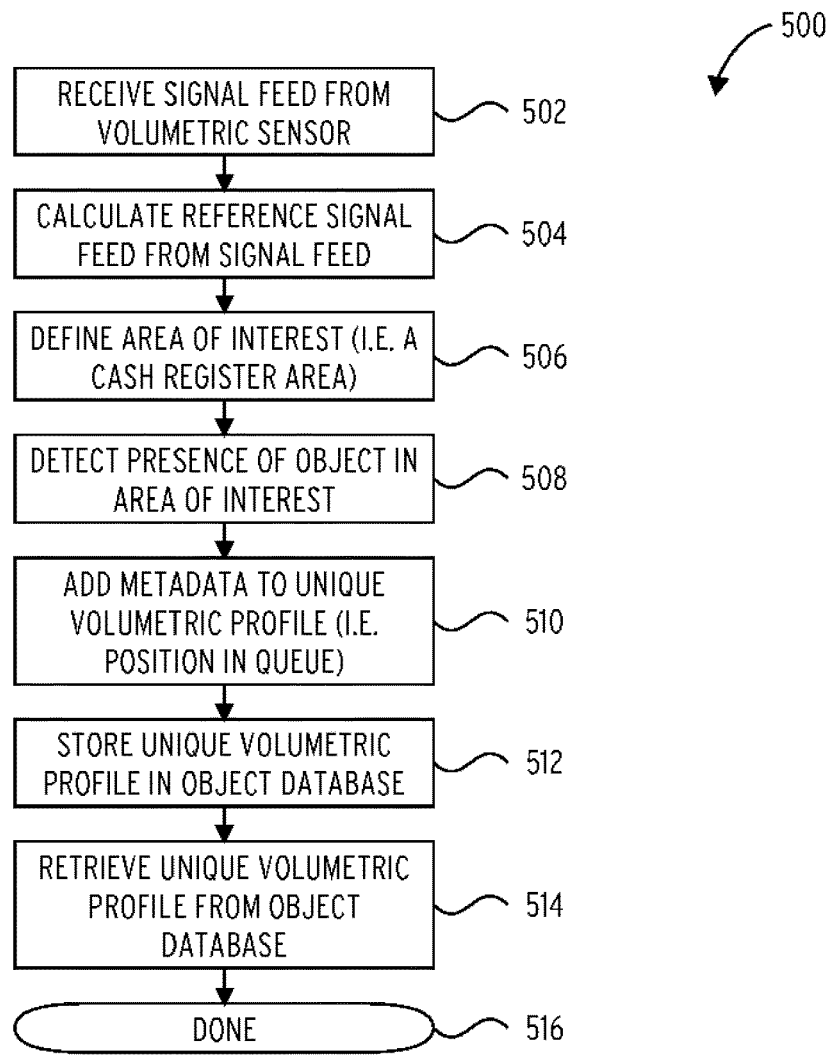
FIG. 5 illustrates a routine for tracking an area of interest in a reference signal feed in accordance with one embodiment.

FIG. 5 shows an example embodiment of an area of interest tracking system. Such an embodiment is useful, for example, to determine how much time customers spend in an area of interest or to detect when a customer engages with a watched object (i.e. determining whether the customer picked up an object).

In block 502, routine 500 receives a signal feed from a volumetric sensor, such as a thermal sensor or a depth sensor.

In block 504, routine 500 calculates a reference signal feed from the signal feed. As in FIG. 4, the reference signal feed is obtained by detecting non-movable objects in the signal feed. Other filters may also be applied, such as ignoring all objects outside (above or below) of a height threshold.

In block 506, routine 500 defines a 3D area of interest. A 3D area of interest is any area, such as a product display or a cash register, where the behavior of a moving object is measured. In one embodiment, the 3D area of interest may be useful, for example, to detect how much time a customer is engaged with a customer representative. Another embodiment may be used to determine whether a customer picked up an object contained in the 3D area of interest.

In block 508, routine 500 detects the presence of an object in the signal feed. When an object is detected, the routine 500 detects the object's contour and calculates the volumetric representation from said contour. In block 510, routine 500 generated a unique volumetric profile and adds metadata from the object to said unique volumetric profile. The unique volumetric profile contains metadata about the object such as time spent in the 3D area of interest or how many objects the customer has picked up, among others.

In block 512, routine 500 stores the unique volumetric profile in an object database. In block 514, routine 500 retrieves the unique volumetric profile from the object database. This may be needed, for example, to compare the unique volumetric profile with a new object detected in the reference signal feed. In done block 516, routine 500 ends.

Figure 6:
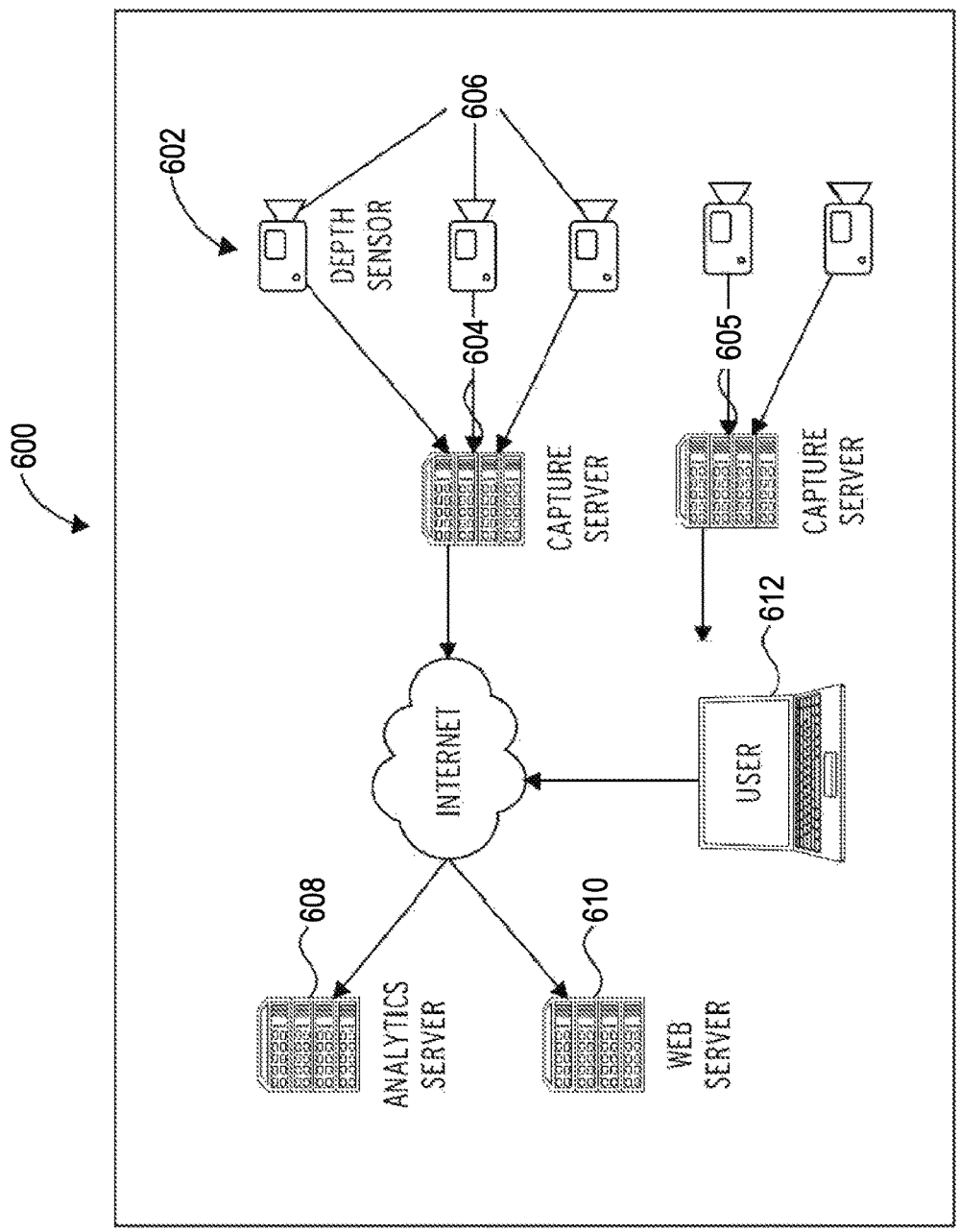
FIG. 6 illustrates an exemplary infrastructure for the person tracking system.

According to FIG. 6, tracking system 600 includes a capture server 604 operationally connected to a plurality of sensors 606 in a physical site. The plurality of sensors 606 includes at least one depth sensor 602. The plurality of sensors 606 may include any suitable type of sensor such as a video camera, a microphone, or other sensors. The data captured by the capture server 604 is filtered and processed to obtain a volumetric representation of a moving person captured by the plurality of sensors 606. These volumetric representations are further processed to obtain a unique volumetric id and a unique volumetric profile for each moving person. The unique volumetric profile may include metadata such as the unique volumetric centroid and the unique volumetric position of the moving person. The capture server may share its person database with other associated capture servers 605.

After processing the captured data, the capture server 604 generates and sends data packet to the analytics server 608. As discussed, said data packet contains metadata information about the moving persons captured by the plurality of sensors 606. Communication between the capture server 604 and the analytics server 608 may be initiated in any suitable fashion such as a remote procedure call or an API. In some embodiments, the communication is performed in JSON, YAML, XML, or any similar format. In some embodiments, communication is performed by way of database or storage replication.

The analytics server 608 further processes the data from the capture server 604. For instance, the analytics server 608 may aggregate data from a plurality of capture servers. According to some embodiments, the analytics server 608 applies techniques to determine aggregated information from a plurality of physical sites. After analytics server 608 processes the data, it places the result in a format suitable for display in a web server 610. The web server 610 provides access to a user 612 to the processed data in analytics server 608.

The capture server 604, analytics server 608 and web server 610 each include at least one processor, RAM memory, a storage, and a connection to the Internet.

In block 702, routine 700 receiving a signal feed from a plurality of sensors. The plurality of sensors includes at least one depth sensor 602. Other types of sensors, such as thermal sensors and video cameras, may be suitable for obtaining and annotating volumetric representations of a person. In block 704, routine 700 determining a reference signal feed from the signal feed. The reference signal feed is obtained by detecting non-movable objects in the signal feed. Other filters may also be applied, such as ignoring all objects outside (above or below) of a height threshold. This may be useful, for example, to ignore objects such as plants, crowd control devices, lamps, and other undesired objects. In block 706, routine 700 determines a volumetric representation of at least one person not present in the reference signal feed. When the person is detected, the contour of said person is obtained. In block 708, routine 700 assigns a unique volumetric profile to the at least one person. The unique volumetric profile contains all metadata obtained from the person. In one embodiment, the unique volumetric profile contains metadata from a plurality of sensors, such as video cameras, thermal sensors, microphones, and others. In some embodiments, said metadata contains color, height, temperature, and others. In block 710, routine 700 stores the unique volumetric profile in a person database. The person database may be any kind of suitable storage such as a structured database, a column-based database or a text file in a format such as JSON or YAML. This may be needed, for example, to compare the unique volumetric profile with a new person detected in the reference signal feed. In block 712, routine 700 obtains a unique volumetric id from a plurality of volumetric attributes. Assigning a unique volumetric id may be performed by finding unique features of a person based on the person's metadata and additional indirect calculations, such as its total volume, height, position, weight, color and others. In one embodiment, these unique features are simply based on the location of the person. In other embodiments, statistical and machine learning techniques may be used to train the system and later identify a volumetric representation once it reappears on screen after leaving the reference signal feed. In "DONE" block 714, routine 700 ends.

Figure 8:
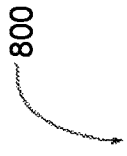
FIG. 8 illustrates a routine in accordance with one embodiment.

FIG. 8 shows an example embodiment of a person tracking system. Such an embodiment is useful, for example, for determining if the same person has been in an area without knowing their identity.

In block 802, routine 800 receives a signal feed from a volumetric sensor. In block 804, routine 800 calculates a reference signal feed from the signal feed. In block 806, routine 800 determines an optimal signal space for detecting persons. In block 808, routine 800 detects the presence of a person in the signal feed. In block 810, routine 800 assigns a unique volumetric profile to the person. In block 812, routine 800 adds metadata from the person to the unique volumetric profile, such as color, sounds, height, temperature, and others. In block 814, routine 800 stores the unique volumetric profile in a person database. In block 816, routine 800 retrieves the unique volumetric profile from the person database. Storage and retrieval of the unique volumetric profile may be used, for example, to compare the unique volumetric profile with other unique volumetric profiles detected in different reference signal feeds. This comparison may be used to determine if a person has been in signal feed (i.e. a place), without knowing their identity. In "DONE" block 818, routine 800 ends.

While the invention has been described with reference to specific embodiments, it will be understood by those skilled in the art that various changes may be made and equivalents may be substituted for elements thereof without departing from the true spirit and scope of the invention. In addition, many modifications may be made without departing from the essential teachings of the invention.

What is claimed is:

1. A method comprising the steps of:
   receiving, by a capture server, a signal feed from a plurality of sensors, said signal feed comprising at least one area of interest, said plurality of sensors comprising at least one depth sensor,
   determining a reference signal feed from the signal feed,
   determining a volumetric representation of at least one person not present in the reference signal feed,
   assigning a unique volumetric profile to said at least one person,
   storing said unique volumetric profile in a person database,
   wherein said unique volumetric profile comprises a unique volumetric id obtained from a plurality of volumetric attributes comprising at least a unique volumetric position and a unique volumetric centroid.

2. The method of claim 1, further comprising processing an aggregated data based on a plurality of unique volumetric profiles stored in the person database.

3. The method of claim 2, wherein the aggregated data comprises a number of persons in a physical space.

4. The method of claim 2, further comprising the step of comparing said unique volumetric profile with a plurality of unique volumetric profiles stored in said person database.

5. The method of claim 1, wherein the unique volumetric attributes further comprise a total volume, height, and weight.

6. The method of claim 1, wherein the plurality of sensors further comprises at least one video sensor and the unique volumetric attributes further comprise color.

7. The method of claim 1, wherein the plurality of sensors further comprises at least one thermal sensor and the unique volumetric attributes further comprise temperature.

8. A computing apparatus, the computing apparatus comprising:
   a processor; and
   a memory storing instructions that, when executed by the processor, configure the apparatus to a processor execute the steps of:
   receive a signal feed from a volumetric sensor,
   calculate a reference signal feed from the signal feed,
   determine optimal space for detecting persons,
   detect the presence of a person in the reference signal feed,
   assign a unique volumetric profile to the person,
   said unique volumetric profile comprising a unique volumetric id and a unique volumetric position,
   store the unique volumetric profile in a person database, and
   retrieve the unique volumetric profile from the person database.

9. The computing apparatus of claim 8, wherein the unique volumetric profile further comprises a total volume, height, and weight.

10. The computing apparatus of claim 8, wherein the plurality of sensors further comprises at least one video sensor and the unique volumetric profile further comprises color.

11. The computing apparatus of claim 8, wherein the plurality of sensors further comprises at least one thermal sensor and the unique volumetric profile further comprises temperature.

12. The computing apparatus of claim 8, wherein the processor is further configured to execute the step of comparing said unique volumetric profile with a plurality of unique volumetric profiles stored in said person database.

13. A non-transitory computer-readable storage medium, the computer-readable storage medium including instructions that when executed by a computer, cause the computer to a processor execute the steps of:
   receive a signal feed from a volumetric sensor,
   calculate a reference signal feed from the signal feed,
   determine optimal space for detecting persons,
   detect the presence of a person in the signal feed,
   assign a unique volumetric profile to the person,
   said unique volumetric profile comprising a unique volumetric id and a unique volumetric position,
   store the unique volumetric profile in a person database, and
   retrieve the unique volumetric profile from the person database.

14. The non-transitory computer-readable storage medium of claim 13, wherein the unique volumetric profile further comprises a total volume, height, and weight.

15. The non-transitory computer-readable storage medium of claim 13, wherein the plurality of sensors further comprises at least one video sensor and the unique volumetric profile further comprises color.

16. The non-transitory computer-readable storage medium of claim 13, wherein the plurality of sensors further comprises at least one thermal sensor and the unique volumetric profile further comprises temperature.

17. The non-transitory computer-readable storage medium of claim 13, further comprising the step of comparing said unique volumetric profile with a plurality of unique volumetric profiles stored in said person database.

* * * * *